April 27, 1926.
F. A. ECKELMANS
PIPE
Filed Dec. 11, 1924
1,582,670
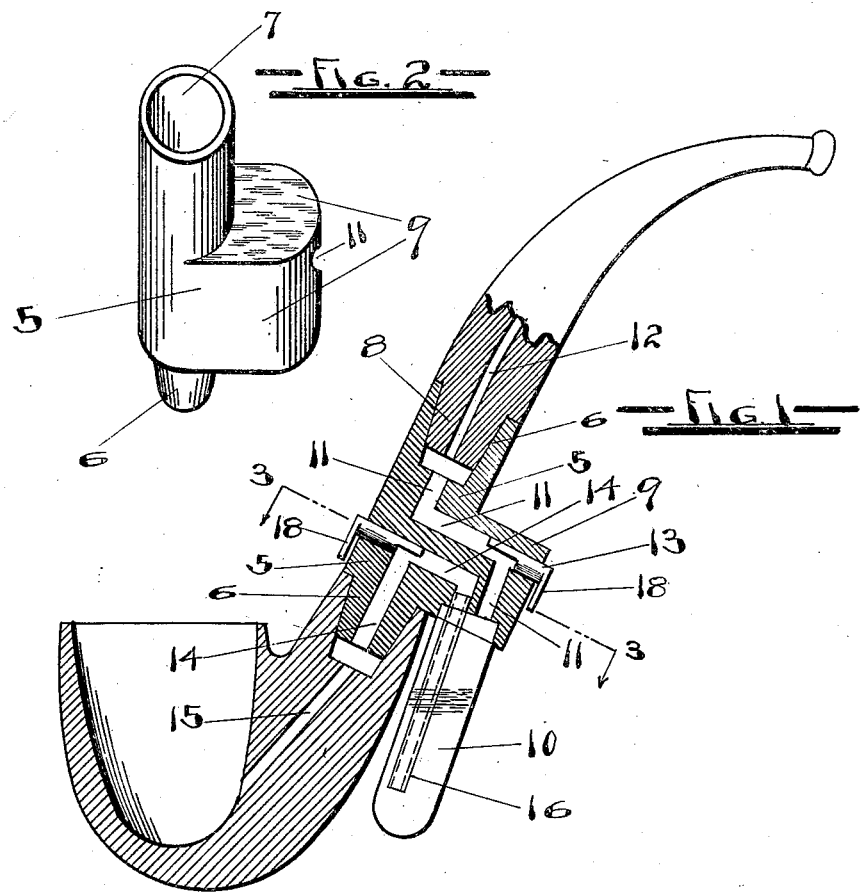
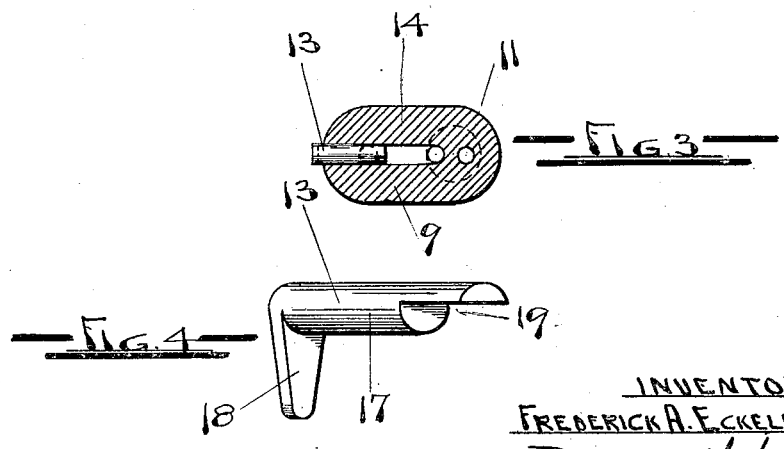
INVENTOR
FREDERICK A. ECKELMANS
BY C. F. Alden
ATTY.

Patented Apr. 27, 1926.

1,582,670

UNITED STATES PATENT OFFICE.

FREDERICK A. ECKELMANS, OF PORTLAND, OREGON.

PIPE.

Application filed December 11, 1924. Serial No. 755,257.

*To all whom it may concern:*

Be it known that I, FREDERICK A. ECKELMANS, a citizen of the United States, residing at Portland, county of Multnomah, State of Oregon, have invented certain new and useful Improvements in Pipes, of which the following is a specification.

My invention relates to pipes in general, and particularly to smoking pipes, the object being to provide a water cooled anti-nicotine pipe conforming to the usual shape and size of smoking pipes, and also to provide such a device as is adaptable to pipes already in use. I accomplish this object by means of the construction illustrated in the accompanying drawing, which is a part of this application for Letters Patent, like characters of reference indicating like parts throughout the several views thereof, and in which:

Fig. 1 is a sectional elevation of a pipe with my device installed thereupon.

Fig. 2 is a perspective view of my device detached.

Fig. 3 is a section upon line 3—3 of Fig. 1.

Fig. 4 is an enlarged perspective view of one of the controlling valves.

In general my device consists of a block mountable between the pipe bowl and the pipe stem and having a liquid receptacle thereupon, and being provided with ports for directing the smoke through the liquid within said receptacle, said ports being provided with a valve arrangement to facilitate the cleaning of the device.

The block 5 is provided with means for securing it upon the pipe bowl, conveniently a conical projection 6 adapted to fit into a recess in the stem of the pipe bowl, and also with means for mounting thereupon the pipe stem, conveniently a recess 7 adapted to receive a projection upon the pipe stem 8. Said block is also provided with an extension 9, and depending from said extension is a liquid receptacle, which receptacle is to be filled with a liquid when the pipe is in use, such liquid being preferably water, the receptacle being shown at 10 in Fig. 1. Said receptacle is conveniently made of glass, and is secured to the block extension 9 in any convenient water-tight manner, such as cement, or it may simply be made a pressed fit within said extension, and thus be readily removed for cleaning.

A port 11 connects a port 12 in the pipe stem with said receptacle, and a valve 13 is provided to regulate the size of said port, and also to be removed for conveniently cleaning said port. A port 14 connects a port 15 in the pipe bowl stem with said receptacle, and a tube 16 projects from said port 14 downward into said receptacle to a point adjacent the bottom thereof. A valve 13 is also provided for port 14 similarly to port 11 described above.

The valves 13 consist of a cylindrical portion 17 adapted to be tightly fitted into the ports 11 and 14, and having a handle 18 for rotating the valves. The valves are conveniently inserted into the horizontal portions of their respective ports, and made to extend over the vertical portions of said ports, and the ends thus projecting over the vertical port portions are cut away as shown at 19 in Fig. 4. It is readily seen that by rotating these valves the respective ports may be completely closed or opened to any desired extent, thus providing an adjustable degree of suction for the pipe, and also that the valves may be readily removed for convenient cleaning of the ports. The valves are arranged for the further convenience of cleaning the pipe when in use. By opening the valve 13 controlling the port 14 (removing said valve) air may be sucked from the atmosphere through the port 14 and thus into and through all the other ports without drawing any smoke through the device, thus cleaning all the ports thereof, including the tube 16.

When the pipe is in use the smoke is delivered from the pipe bowl to the receptacle 10 through the port 14, and into the water within said receptacle through the tube 16, whence it bubbles upward through the water, and is delivered to the pipe stem through port 11. As the smoke bubbles through the water within the receptacle 10 it is cooled and washed free of a considerable portion of its nicotine.

It will be observed that the whole device may be readily removed from the pipe, and the valves 13 and receptacle 10 removed from the block 5, and then all parts easily washed and cleaned. It will be further observed that the device may be built as an integral part of a pipe, or as a separate device adaptable to any pipe already in use.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claim.

Having disclosed my invention so that others may be enabled to construct and to use the same, what I claim as new and desire to secure by Letters Patent is:

In a smoking pipe, a block mountable between the bowl and the stem of said pipe, a liquid receptacle mounted upon said block, a port connecting the pipe bowl with said receptacle, a port connecting the pipe stem with said receptacle, a tube extending from said former port into said receptacle, and valve mechanism in said block adapted to control each of said ports independently and to open either of said ports to the atmosphere.

In witness that I claim the foregoing as my invention, I hereunto affix my signature at Portland, county of Multnomah, State of Oregon, this 29th day of July, 1924.

FREDERICK A. ECKELMANS.